(12) United States Patent
Meyers

(10) Patent No.: US 6,559,436 B1
(45) Date of Patent: May 6, 2003

(54) IMAGE INTENSIFIER FOR NIGHT VISION EQUIPMENT WHICH EMPLOYS A FILTER THAT LIMITS TRANSMISSION TO LIGHT IN THE BLUE WAVELENGTH

(76) Inventor: Brad E. Meyers, 2717 200th Ave., SE., Issaquah, WA (US) 98027

( * ) Notice: Subject to any disclaimer, the term of this patent is extended or adjusted under 35 U.S.C. 154(b) by 164 days.

(21) Appl. No.: 09/655,617

(22) Filed: Sep. 6, 2000

(51) Int. Cl.[7] .............................................. G02B 23/04

(52) U.S. Cl. ................................ 250/214 VT; 359/630

(58) Field of Search ........................ 250/214 VT, 333, 250/207; 359/630; 600/109, 160; 313/103 CM, 105 CM

(56) References Cited

U.S. PATENT DOCUMENTS

| | | | | |
|---|---|---|---|---|
| 4,398,685 A | * | 8/1983 | Task et al. .................. | 244/135 |
| 5,335,060 A | * | 8/1994 | Gentile et al. ........... | 250/252.1 |
| 5,644,122 A | * | 7/1997 | Siegenthaler et al. . | 250/214 VT |

* cited by examiner

Primary Examiner—Stephone B Allen
(74) Attorney, Agent, or Firm—Dorsey & Whitney LLP

(57) ABSTRACT

The invention is an improved image intensifier for night vision equipment. It includes an optical filter that is positioned between the phosphor output and eyepiece of the image intensifier. The filter is dichroic and limits light transmission to light that is substantially in the blue wave length. The filter minimizes reflections on the eye of the user that might otherwise be visible to others who are using night vision equipment.

7 Claims, 3 Drawing Sheets

IMAGE INTENSIFIER FOR NIGHT VISION EQUIPMENT WHICH EMPLOYS A FILTER THAT LIMITS TRANSMISSION TO LIGHT IN THE BLUE WAVELENGTH

TECHNICAL FIELD OF THE INVENTION

This invention relates to night vision equipment. More particularly, it relates to an image intensifier for night vision equipment.

BACKGROUND OF THE INVENTION

Modern image intensifiers typically use phosphor outputs that present bright green images to the viewer. These images can be emerald green to various shades of lime green in color, depending upon the phosphor that is used.

The human eye is most sensitive to the color green— which makes it easy to view the green light phosphor outputs from intensified images. Likewise, the emissions of green light from phosphor outputs are easy to see by others who are using image intensification or night vision equipment.

If one individual is using the typical green light image intensifier in connection with operating a weapon site, or in another night vision application, the green image produced by the intensifier optics is reflected directly back and shines on the operator's eye and face. It is not unusual for a large portion of the reflection to cover an area around and outside the user's eye. During a combat situation, the reflection can appear as a bright spot to an opposing party who is also using night vision equipment. Not only does it create a point of detection, but the point also becomes a target point.

To minimize the above problem, rubber eyecups are used to shield green light reflections from image intensifiers. Nevertheless, there is generally some noticeable light leakage, particularly when large biocular eyepieces or eyepieces with long eye relief are used.

The device described here prohibits or greatly reduces the emission from the phosphorus screen of an image intensifier. It allows the user of night vision equipment to remain undetected when the opposing side is also using long range night vision equipment.

SUMMARY OF THE INVENTION

The invention is an improved filter for use in an image intensifier for night vision equipment. The filter is dichroic. It is positioned between the user's eye and the output of an image intensifier tube. The filter permits transmission of light that is substantially in the wave length blue and effectively blocks most of the green wave length as well as other wave lengths. While blue light can be viewed by the person using the image intensifier, it is not highly visible to others using night vision equipment. Therefore, the dichroic filter minimizes or eliminates the targeting spot created by conventional image intensifiers.

The invention is described in greater detail below.

BRIEF DESCRIPTION OF THE DRAWINGS

In the drawings, like reference numerals refer to like parts throughout the various views, and wherein.

DETAILED DESCRIPTION OF THE INVENTION

Figure 1:
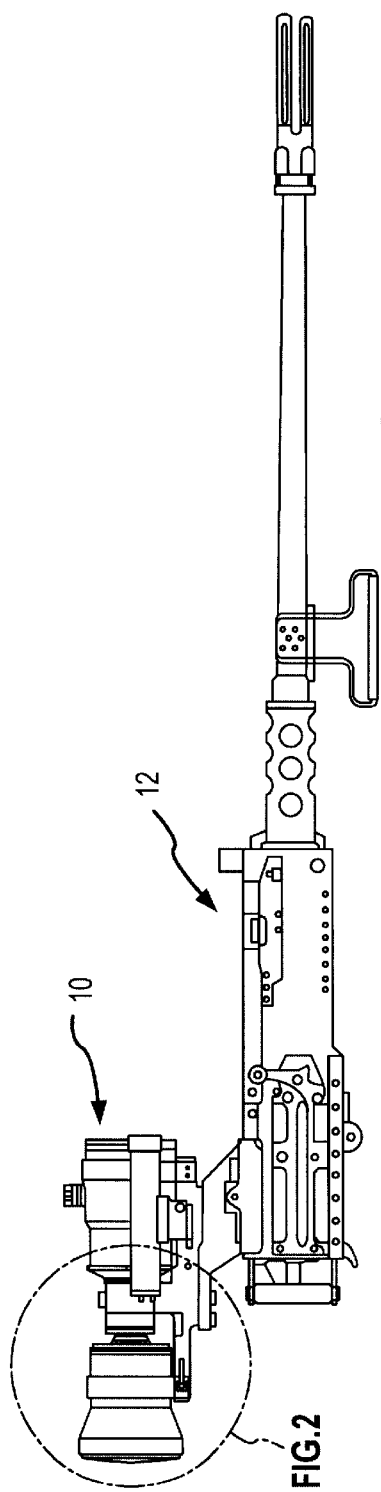
FIG. 1 is a pictorial view of night vision equipment, including an image intensifier made in accordance with the invention, mounted to a weapon.

Referring to FIG. 1, shown generally at 10 is an image intensifier device mounted to a weapon 12. The construction of the image intensifier would be familiar to a person skilled in the art. That person would know that the intensifier has a phosphor output and be familiar with how it works.

Figure 2:
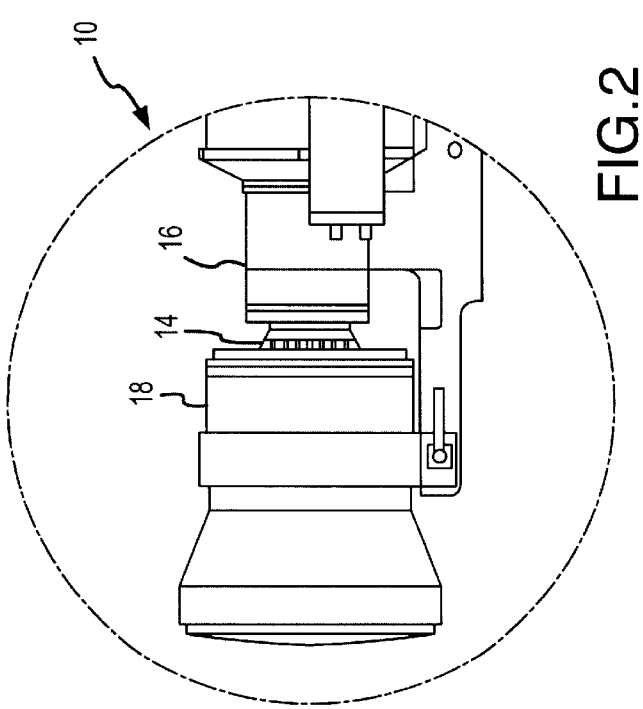
FIG. 2 is an enlarged view of the image intensifier shown in FIG. 1.
Figure 3:
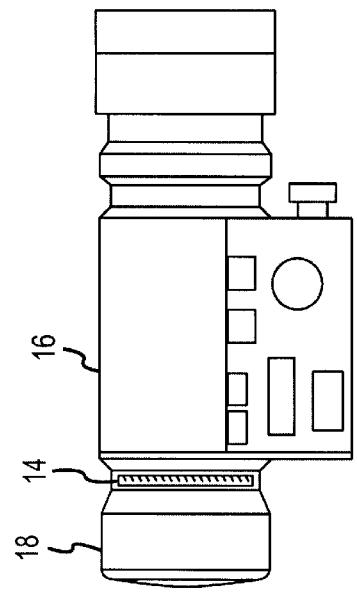
FIG. 3 is a view similar to FIG. 2 and shows another style of image intensifier.

Referring to FIGS. 2 and 3, the construction of the invention is very simple. It is a dichroic filter 14 positioned between the source of phosphor emissions 16 and the eyepiece 18. Obviously, image intensifiers will vary in construction. The key is to position the filter 14 between the phosphor output and the user's eye.

A dichroic filter is one that selectively transmits light according to its wavelength and not its plane of vibration. With respect to isotropic materials, a dichroic filter transmits light as a function of wavelength, regardless of its plane of vibration.

Figure 4:
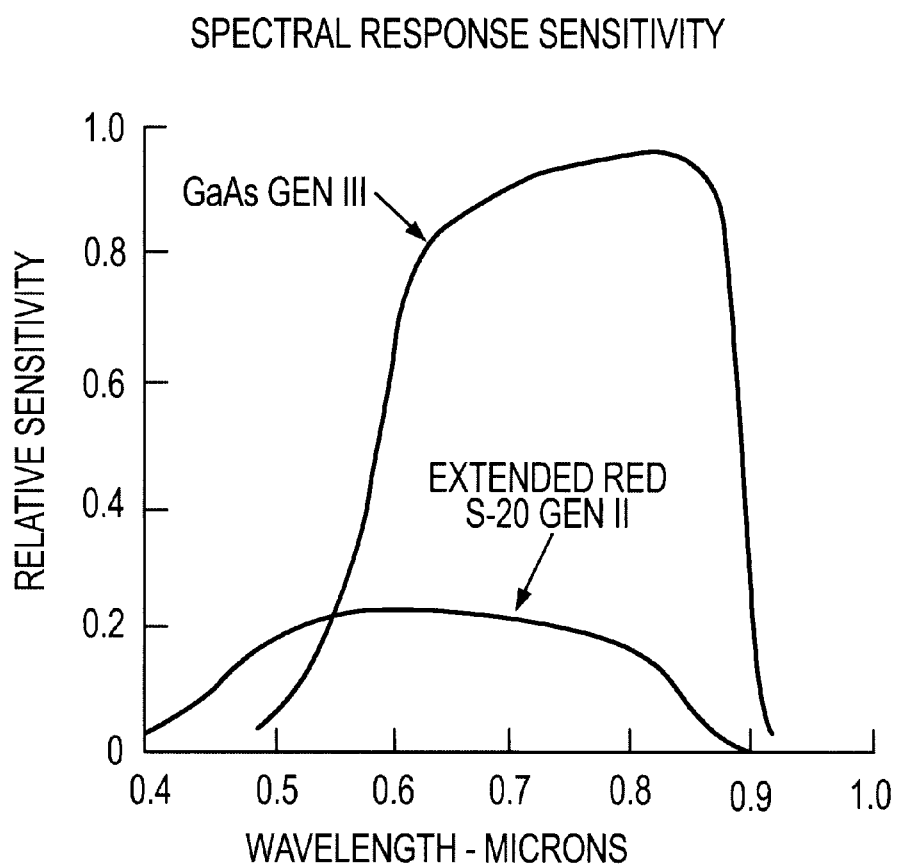
FIG. 4 is a chart that illustrates the spectral response sensitivity of a typical image intensifier and shows its ability to see the blue wavelength compared to red, green, and other colors.

FIG. 4 illustrates the spectral response of typical night vision equipment. As can be seen, night vision equipment has high sensitivity to colors in the red-green portion of the spectrum (approximately between about 550 and 920 nanometers). It is far less sensitive to the blue wavelength (approximately between around 400 and 520 nanometers).

Figure 5:
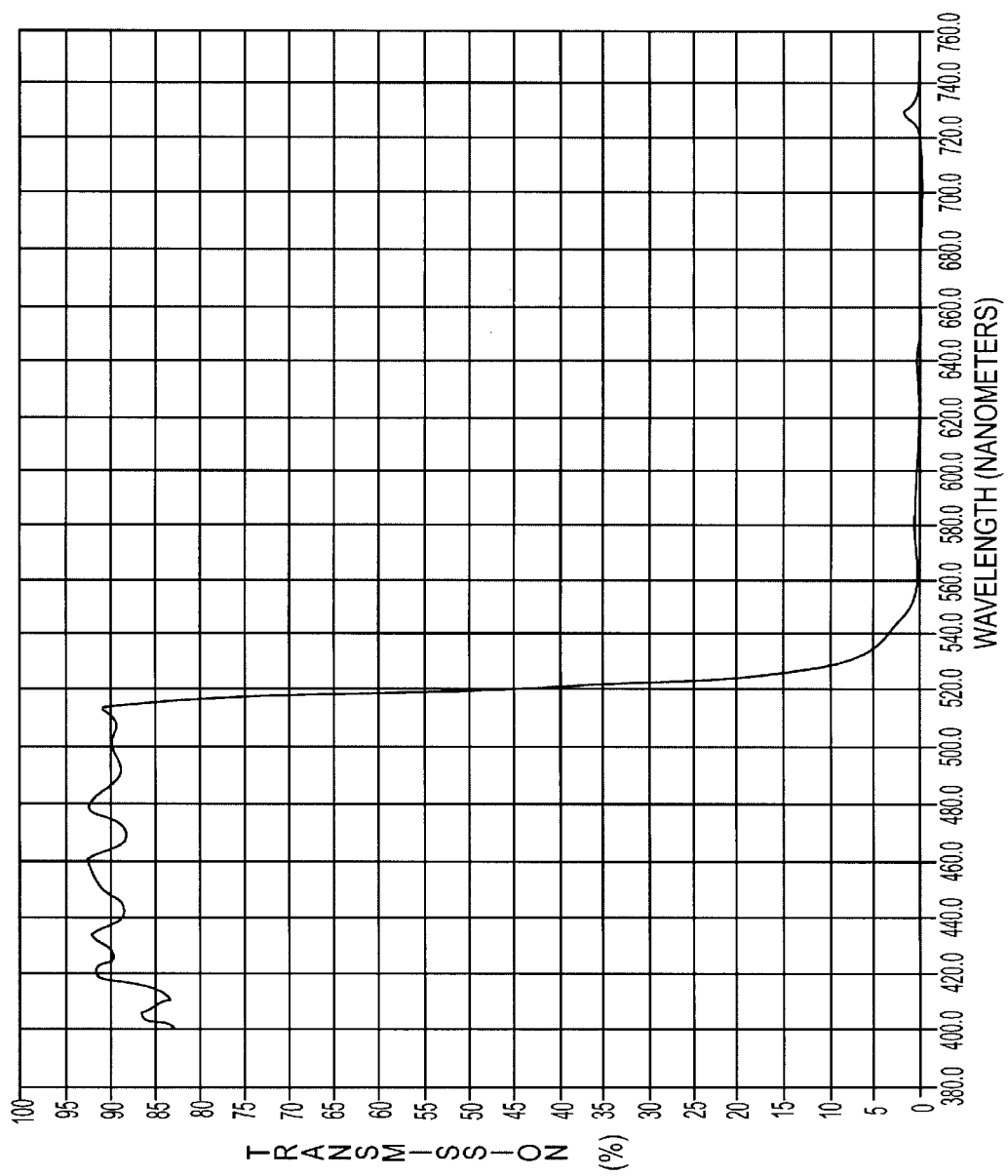
FIG. 5 is a chart that illustrates the spectral response sensitivity of a dichroic filter used in accordance with the invention.

FIG. 5 illustrates the effect of using the dichroic filter 14. It blocks green, yellow, red, and infrared effectively, but allows nearly 100% transmission of blue and a small amount of blue-green.

A person knowledgeable about filtering materials would know about dichroic filters. However, the use of a dichroic filter in night vision equipment is new and novel. In this case, it is used to allow the transmission of blue light and block other colors. As mentioned above, a small amount of green or blue-green light will pass through a dichroic filter according to the invention. Therefore, the selection of the wording used in the claim is to be read according to the spectral response charts included as FIGS. 4 and 5.

The invention is not to be limited to the particular design of night vision equipment disclosed here. There are other possible applications that this invention may solve in the same way as the problem described above. Therefore, the invention is to be limited only by the subjoined claims that follow.

What is claimed is:

1. An improved image intensifier for night vision equipment, including an optical filter positioned relative to the output of an image intensifier, the filter being characterized in that it limits light transmission to light that is substantially in the blue wave length.

2. An image intensifier having a phosphor output, and a dichroic filter positioned between the phosphor output and a position of a user's eye wherein the filter transmits only those wavelengths within a blue/blue-green portion of the spectrum.

3. An image intensifer for use in night vision equipment, the intensifier having a phosphor output and an eyepiece, and a dichroic filter positioned between the phosphor output and the eyepiece, the filter being characterized in that it limits light transmission to light that is substantially in the blue wave length.

4. An viewing apparatus, comprising:

an eyepiece;

a source of electromagnetic emissions; and a filter positioned between the eyepiece and the source of electromagnetic emissions, the filter being adapted to block electromagnetic emissions not having a wavelength within a range of approximately 400 nanometers to approximately 560 nanometers, inclusive, and to transmit electromagnetic emissions within the range.

5. The apparatus according to claim 4 wherein the source of electromagnetic emissions comprises an image intensifier.

6. The apparatus according to claim 4 wherein the source of electromagnetic emissions comprises a phosphor emission source.

7. The apparatus according to claim 4 wherein the filter is adapted to block electromagnetic emissions not having a wavelength within the range of approximately 400 nanometers to approximately 520 nanometers.

* * * * *